Dec. 27, 1955  A. C. MAYO  2,728,280
ROLL FILM CAMERA CONSTRUCTION ENABLING
CUTTING OF EXPOSED FILM
Filed Sept. 25, 1950
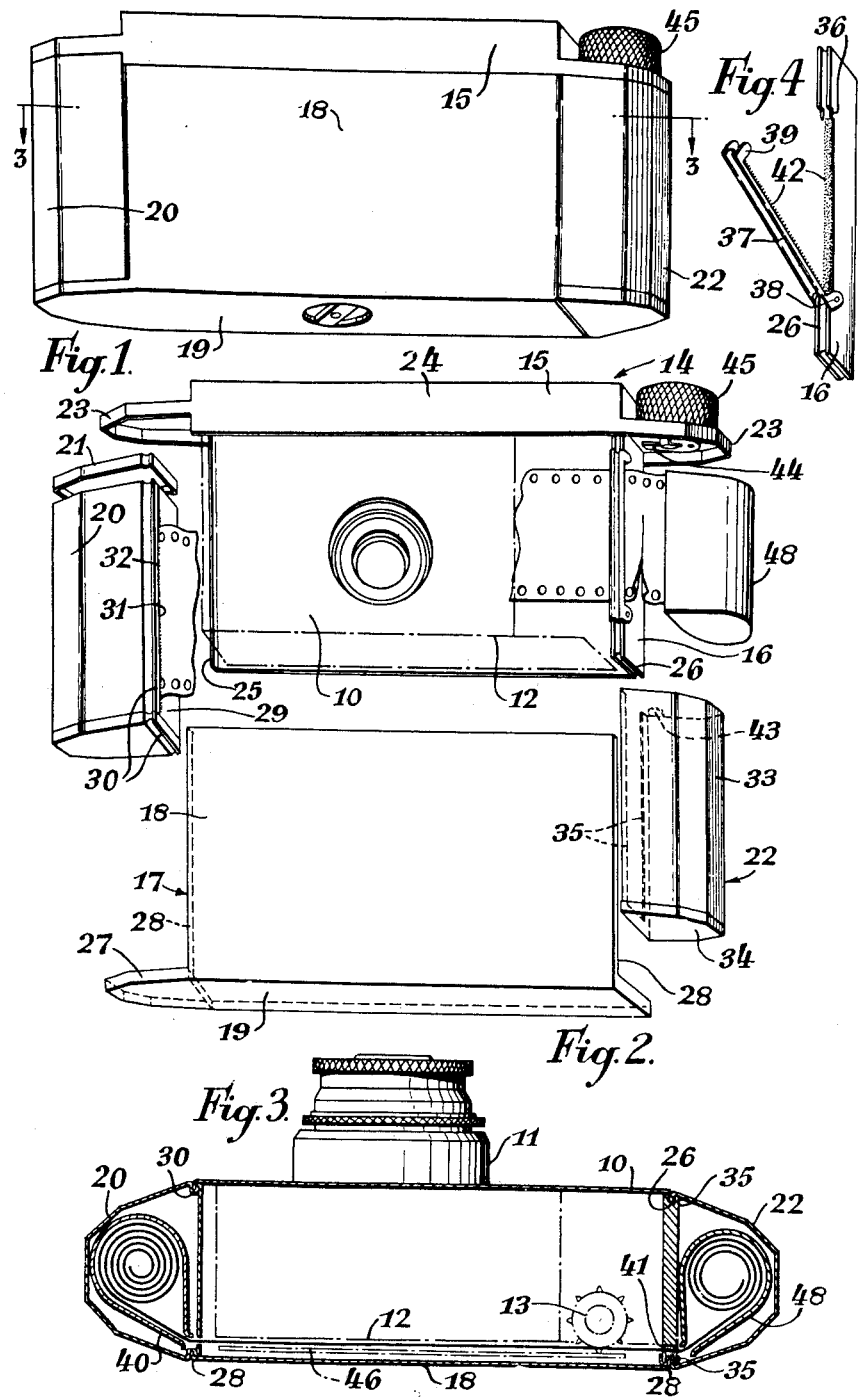

United States Patent Office 2,728,280
Patented Dec. 27, 1955

2,728,280
ROLL FILM CAMERA CONSTRUCTION ENABLING CUTTING OF EXPOSED FILM

Alfred Croger Mayo, Richmond, England

Application September 25, 1950, Serial No. 186,546

Claims priority, application Great Britain October 5, 1949

1 Claim. (Cl. 95—31)

This invention relates to photographic cameras, and has for its object to provide a roll-film camera in which there is provision for the removal, for processing, of the exposed portion of the film after any number of exposures less than that using up the whole of a roll of film inserted in the camera has been made, without disturbing the unexposed part of the film in the camera.

In a roll-film camera according to the invention, the film, after passing across the picture gate, passes through a light-tight partition separating from the main body of the camera a film-receiving compartment adapted to be opened to provide access to the exposed film.

In one form of roll-film camera according to the invention a light-tight partition is provided between the picture gate and a film-receiving compartment into which the exposed film is propelled, the light-tight partition having a slot for the passage of the film, and the film receiving compartment having a removable light-tight cover.

A removable film magazine is preferably provided to house the unexposed film, the said magazine comprising a light-tight box having a slot for the exit of the film.

The invention is hereinafter described with reference to the accompanying drawings, in which:

Figure 1 is a rear perspective view of one form of camera according to the invention;

Figure 2 is an exploded view showing, in perspective, the various parts of the case of the camera shown in Figure 1;

Figure 3 is a transverse section on the line 3—3 of Figure 1, the internal mechanism of the camera being omitted, and Figure 4 is a detail.

Referring to the drawings, the camera comprises a case the front wall 10 of which supports a lens mount 11, and a detachable chassis, shown in chain dotted lines at 12, which supports the shutter, the shutter operating mechanism, and the film-winding mechanism, the latter including a spindle carrying toothed wheels, which is indicated in chain-dotted lines at 13 in Figure 3.

The case is in four parts, one of which, 14 comprises the front wall 10, a top 15, and a partition 16. This part of the casing supports the chassis 12 carrying the mechanism. A second part 17 of the case includes the back wall 18 and a base 19, the latter extending, at one end, only to a point corresponding to the position of the partition 16 on the part 14. The third part is a light-tight container 20 serving as a film magazine and having a removable end 21; and the fourth part is an end cover 22.

The top 15 which extends the full length of the camera, has flanges 23 around its end portions, and a wider flange 24 along its rear edge. The front wall 10 has an inturned flange 25 at its end opposite to the partition 16, and the partition 16 is grooved at its front, back and bottom edges, as shown at 26.

The base 19 is flanged about the whole of its periphery except where it is joined to the back, the flange being shown at 27, and the back wall 18 has inturned flanges 28 at both ends.

The light-tight container 20 is shaped at its ends to correspond to the shape of the ends of the base 19 and top 15, and has a flat wall 29 on its side which faces the interior of the camera, the edges of this wall at the sides and bottom being grooved as shown at 30. In the flat wall 29 there is formed a slot 31, lined with felt or like material 32 to render it light-tight.

The end cover 22 comprises an end wall 33 corresponding in shape to the outline of the end of the camera, and a base 34, the upright edges of the end wall, and the edge of the base which meets the main base 19, being provided with inturned flanges 35.

The partition 16 is cut away at its rear edge, as shown at 36, and a bar 37 is hinged to the partition below the cut-away portion, by means of ears 38 on the bar projecting on opposite sides of the partition.

The bar has similar ears 39 at its other end to locate it laterally on the partition, and, when set parallel to the edge of the partition forms, with the edge of the cut-away portion, a slot 41 to receive the film, the sides of the slot being lined with felt or like material 42 to render it light-tight. The outer side of the bar is grooved to correspond with the groove 26 in the partition.

The end cover 22 is provided at its upper end with an inturned lug 43 which is engaged, to lock the end cover in position, by a latch 44 mounted on the inner face of the top of the camera and operated from the exterior by a knob 45.

The camera case is opened for loading by removing the end cover 22 and the part 17, thus releasing the film magazine 20. The magazine 20 receives either a casette 40 containing a perforated film, or a roll of film may be placed directly in the magazine, without a casette. The end of the film is brought out through the slot 31. The end 21 of the magazine is replaced, and the magazine is fitted on to the part 14 with the flange 25 located in the groove 30 along one edge of the magazine, the top of the magazine fitting within the flange 23 of the top. The film is then drawn out across the back of the camera, underneath a back plate 46, shown in chain-dotted lines in Fig. 3 which holds it in engagement with the teeth of the wheels on the spindle 13, and underneath the bar 37. The part 17 is then refitted, the flanges 28 fitting in the grooves 30 and 26 respectively, and the parts of the flange 27 lying outside the front wall 10 and the lower edge of the magazine, that part of the said flange which extends across the end of the base which meets the lower edge of the partition 16 entering the groove in the lower edge of the partition. A rib 47 extending across the base enters the groove in the lower edge of the wall 29 of the magazine, and the upper edge of the back fits inside the flange 24 of the top. Suitable catches (not shown) are provided for securing the parts 14 and 17 together.

The end of the film projecting through the partition 16 is led into a casette 48 through the usual slot therein, and the casette is covered by the end cover 22 which slides upwardly into position, its flanges entering the grooves 26 in the edges of the partition, and its upper edge fitting inside the flange 23 on the top. The end cover 22 is locked in position by the latch 44.

The film, as it is used, is pushed into the casette 48 by the rotation of the spindle 13, and it will be apparent that any used length of film can be removed by releasing and removing the end cover 22, and severing the film between the partition and the casette 48, without disturbing the remainder of the film. The end of the remaining film is fed into a new casette, and the end cover replaced.

It will be appreciated that the camera described above can be loaded, and the portions of used film removed, without the use of a dark room.

I claim:

A roll film camera having a casing comprising front, rear, top and bottom walls defining a film exposing compartment, said top wall projecting at one end beyond the end of said compartment, a light-tight partition closing the end of said film exposing compartment and having a light-tight slot therein for the passage of a film and an open channel-shaped cover including an end wall at one end only, said cover defining with said projecting top wall and light-tight partition a separate light-tight compartment to receive the exposed film, said light-tight partition having grooves at its edges, said cover having flanges fitting slidably into said grooves, said light-tight partition being cut away at one edge, and a bar hinged to said partition and defining, with said cut-away portion, the light-tight slot in the partition.

References Cited in the file of this patent

UNITED STATES PATENTS

| | | |
|---|---|---|
| 1,424,816 | Grillone | Aug. 8, 1922 |
| 2,070,122 | Goldhammer | Feb. 9, 1937 |
| 2,403,717 | Harvey | July 9, 1946 |
| 2,469,008 | Simon et al. | May 3, 1949 |
| 2,492,900 | Swenson | Dec. 27, 1949 |
| 2,545,196 | Curioni | Mar. 13, 1951 |
| 2,592,158 | Kirby et al. | Apr. 8, 1952 |

FOREIGN PATENTS

| | | |
|---|---|---|
| 354,999 | Germany | June 12, 1922 |
| 265,218 | Great Britain | July 14, 1927 |
| 327,493 | Great Britain | Apr. 10, 1930 |
| 583,515 | Germany | Sept. 5, 1933 |
| 650,013 | Germany | Sept. 9, 1937 |
| 563,308 | Great Britain | Aug. 9, 1944 |